United States Patent
Higashikawa

(10) Patent No.: US 6,318,910 B1
(45) Date of Patent: Nov. 20, 2001

(54) METHOD FOR HERMETICALLY SEALING OPTICAL FIBER INTRODUCING SECTION AND HERMETICALLY SEALED STRUCTURE

(75) Inventor: Kimikazu Higashikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/561,735

(22) Filed: Apr. 27, 2000

Related U.S. Application Data

(62) Division of application No. 09/061,518, filed on Apr. 16, 1998, now Pat. No. 6,074,104.

(30) Foreign Application Priority Data

Apr. 18, 1997 (JP) .................................................. 9-116381

(51) Int. Cl.⁷ .................................................. G02B 6/36
(52) U.S. Cl. .................................................. 385/94
(58) Field of Search .......................................... 385/88–94

(56) References Cited

U.S. PATENT DOCUMENTS

| | | |
|---|---|---|
| 4,119,363 | 10/1978 | Camlibel et al. . |
| 4,741,796 | 5/1988 | Althaus et al. . |
| 4,779,788 | 10/1988 | Rossberg . |
| 5,301,251 | 4/1994 | Moore et al. . |
| 5,351,329 | 9/1994 | Moore et al. . |
| 5,692,086 | 11/1997 | Beranek et al. . |
| 5,815,619 | 9/1998 | Bloom . |

FOREIGN PATENT DOCUMENTS

| | | |
|---|---|---|
| 0645651 | 3/1995 | (EP) . |
| 0690322 | 1/1996 | (EP) . |
| 7-92334 | 4/1995 | (JP) . |
| 7-198973 | 8/1995 | (JP) . |

OTHER PUBLICATIONS

Patent Abstracts of Japan, vol. 095,No. 011, Dec. 26, 1995 & JP 07 198973 A (NEC Corp), Aug. 1, 1995 *abstract*.
Patent Abstracts of Japan, vol. 014, No. 269 (P–1059), Jun. 11, 1990 & JP 02 077704 A (Mitsubishi Gas Chem Co Inc), Mar. 16, 1990 *abstract*.

*Primary Examiner*—Ellen E. Kim
(74) *Attorney, Agent, or Firm*—Ostrolenk, Faber, Gerb & Soffen, LLP

(57) ABSTRACT

A conventional optical fiber not coated with a metal layer is provided. A solder layer is filled into between a case, for an optical module wherein an optical element is optically coupled with the optical fiber within the case, and a cover conforming to the shape of the case, thereby simply conducting hermetical sealing. Thereafter, a resin, such as a silicone resin, is potted in the optical fiber introducing section. The two-layer hermetical sealing can realize a method for hermetically sealing an optical fiber introducing section which can maintain airtightness high enough to ensure long-term reliability of an optical module. This can facilitate the hermetical sealing of an optical device particularly in its optical fiber introducing section.

28 Claims, 7 Drawing Sheets

METHOD FOR HERMETICALLY SEALING OPTICAL FIBER INTRODUCING SECTION AND HERMETICALLY SEALED STRUCTURE

RELATED APPLICATION

This a division of application Ser. No. 09/061,518, filed Apr. 16, 1998, now U.S. Pat. No. 6,074,104.

FIELD OF THE INVENTION

The present invention relates to a method for hermetically sealing an optical device, and particularly to a hermetically sealing method and a hermetically sealed structure in an optical fiber introducing section of an optical module having such a structure that an optical fiber strand is used in an introducing terminal.

BACKGROUND OF THE INVENTION

An optical module is a structure for optically coupling an optical element, such as a semiconductor laser element or a photodetector, with an optical fiber. The optical element should be protected against moisture from the viewpoints of stabilization of properties and high reliability. In general, these optical elements are housed in a case, and the case is hermetically sealed to protect the optical element against moisture outside the case.

Methods for hermetically sealing the case are roughly classified according to the structure of the optical module into two methods, that is, a method wherein a window permeable to light is provided in the case and an optical element provided within the case is optically coupled with an optical fiber outside the case through the window and a method wherein an optical element and an optical fiber are coupled with each other within the case. In recent years, the latter method is mainly adopted from the viewpoint of reducing the size of the optical device.

In a structure provided by the latter method, that is, in a structure wherein an optical element and an optical fiber are coupled with each other within the case, hermetical sealing should be performed between the optical fiber and the case.

A conventional hermetically sealed structure in an optical fiber introducing section is proposed, for example, in Japanese Patent Laid-Open No. 92334/1995. The hermetically sealed structure in an optical fiber introducing section described in this publication comprises: a case; a silicon substrate, with an optical element mounted thereon, fixed within the case; and an optical fiber disposed at a position where the optical fiber is optically coupled with the optical element, and fixed to the silicon substrate.

The optical fiber used in this case is a metal-coated fiber formed by coating a metal layer on the surface of an optical fiber strand, with a resin coating removed therefrom, by plating, sputtering or other method. The coating metal is a material having good solderability, such as nickel or gold. The metal-coated fiber is inserted into between the case and the cover, followed by soldering. As a result, the solder joins the case to the cover and, at the same time, joins the metal layer on the surface of the metal-coated fiber, thus hermetically sealing the interior of the case. Another conventional hermetically sealed structure in an optical fiber introducing section is described, for example, in Japanese Patent Laid-Open No. 198973/1995, wherein a low-melting glass is used.

In this hermetically sealed structure, a quartz optical fiber is provided without coating of a metal layer, and an optical element and the optical fiber are optically coupled with each other, followed by fixation of the optical fiber onto a silicon substrate.

The optical fiber is then inserted into between a case and a cover, a low-melting glass is provided in a portion, between the case and the cover, in its whole circumference, and the low-melting glass is then heat-melted to hermetically seal the interior of the case.

Still another conventional hermetically sealed structure in an optical fiber introducing section is such that the circumference of an optical fiber is sealed with a resin having a hermetically sealing property. In this hermetically sealed structure in an optical fiber introducing section, an optical fiber is provided without coating of a metal layer, an optical element and the optical fiber are optically coupled with each other, followed by fixation of the optical fiber onto a silicon substrate.

The optical fiber is then inserted into between a case and a cover, the resin is filled into a portion between the case and the cover, in its whole circumference, and the resin is then cured to hermetically seal the interior of the case.

The conventional hermetically sealed structures in an optical fiber introducing section have the following respective problems.

(1) The hermetically sealed structure in an optical fiber introducing section using a metal-coated fiber suffers from a problem that the cost of coating the metal layer onto the optical fiber is high.

An additional problem involved in this structure is that selective coating of the metal layer onto the optical fiber introducing section alone lowers the mass productivity.

Further, when the optical fiber is disposed on a V-groove in order to conduct positioning of the optical element and the optical fiber relative to each other, a variation in the thickness of the metal layer resulted in varied outer diameter of the optical fiber, disadvantageously deteriorating the positioning accuracy.

(2) For the hermetically sealed structure in an optical fiber introducing section using a low-melting glass, since the melting point of the low-melting glass is generally high and 430° C. or above, at the time of sealing, the low-melting glass is likely to cause damage to the optical element fixed portion within the case and the optical fiber provided with a protective coating.

(3) The hermetically sealed structure in an optical fiber introducing section using a resin has problems including that the airtightness is greatly influenced by resin coating methods, seal path length, curing conditions and the like, making it impossible to stably conduct the sealing work, the hermetically sealing level of the resin per se is about $10^{-5}$ atm.cc/sec and unsatisfactory for use in optical modules, the reliability under severe environmental conditions such as high temperature and high humidity is low, and the sealed structure is not resistant to heat.

SUMMARY OF THE INVENTION

Accordingly, an object of the present invention is to provide a hermetically sealing method and a hermetically sealed structure in an optical fiber introducing section which can eliminate the need to use an expensive metal-coated fiber, can use a solder material having a melting point below that of a low-melting glass, and enables airtightness high enough to ensure long-term reliability of an optical module to be maintained even under severe environmental conditions.

According to the first feature of the invention, a method for hermetically sealing an optical fiber introducing section in an optical device comprises an optical fiber, an optical element optically coupled with the optical fiber, a case for housing therein the optical element, and a cover for sealing the case, the optical fiber propagating light between the interior and the exterior of the case, said method comprising the steps of: melting and filling a solder into between the optical fiber and the case; hardening the filled solder; and filling a resin into between the optical fiber and the solder and curing the resin.

According to the second feature of the invention, a hermetically sealed structure of an optical device, comprises:

an optical fiber;

an optical element optically coupled with the optical fiber;

a case for housing therein the optical element; and a cover for sealing the case, the optical fiber propagating light between the interior and the exterior of the case, wherein the optical fiber is fixed to the case, in its section at which the optical fiber is introduced into the case, with the aid of a hermetically sealing solder and a resin is filled so as to cover at least a connection between the optical fiber and the solder.

BRIEF DESCRIPTION OF THE DRAWINGS

The invention will be explained in more detail in conjunction with appended drawings, wherein.

DESCRIPTION OF THE PREFERRED EMBODIMENTS

Before describing the hermetically sealed structure in an optical fiber introducing section in a preferred embodiment according to the present invention, the aforementioned conventional hermetically sealed structures in an optical fiber introducing section will be explained in conjunction with FIGS. 1 to 3.

A first conventional method for hermetically sealing an optical fiber introducing section is proposed, for example, in Japanese Patent Laid-Open No. 92334/1995. This method is shown in FIG. 1. Specifically, FIG. 1 is a longitudinal sectional view illustrating the method for hermetically sealing an optical fiber introducing section described in Japanese Patent Laid-Open No. 92334/1995. The first conventional method will be explained with reference to FIG. 1.

Figure 1:
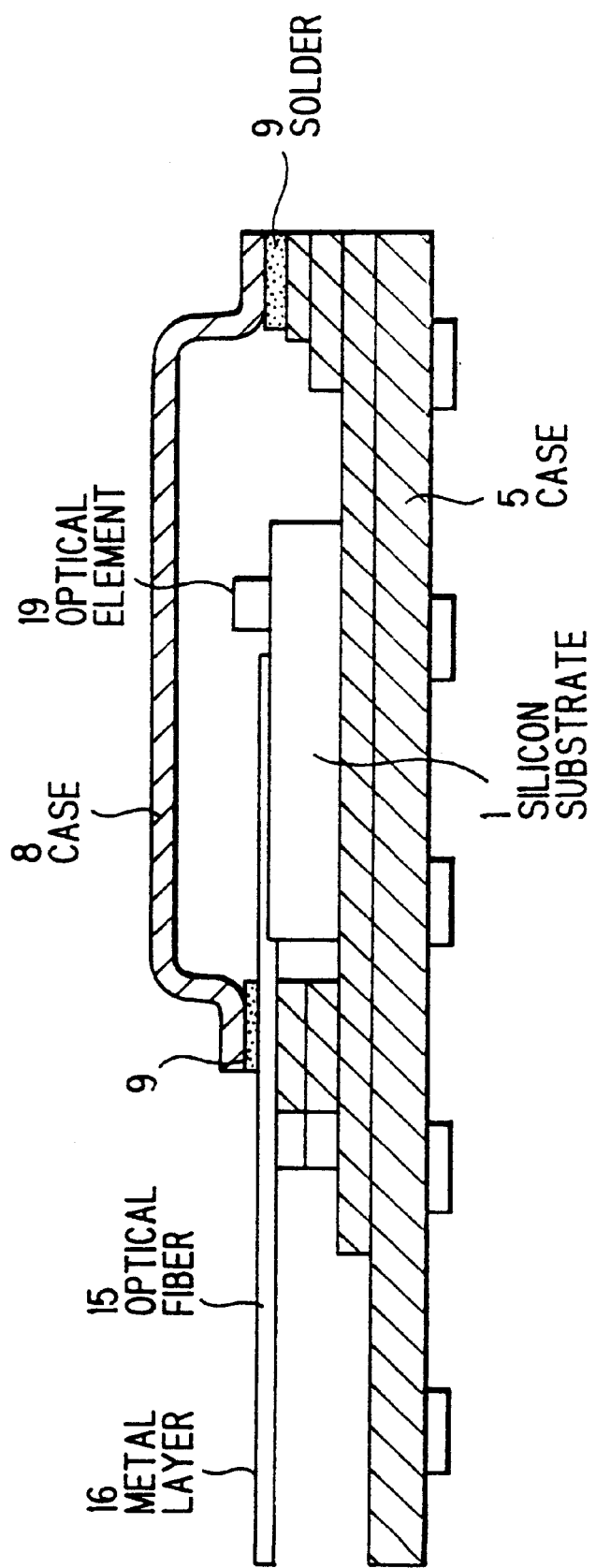
FIG. 1 is a cross-sectional view showing a conventional hermetically sealed structure in an optical fiber introducing section.

In FIG. 1, a silicon substrate 1 with an optical element 19 mounted thereon is fixed within a case 5. An optical fiber 15 is then disposed, at a position wherein the optical fiber 15 is to be optically coupled with the optical element 19, and fixed to the silicon substrate 1.

The optical fiber used in this case is a metal-coated fiber 15 formed by coating a metal layer 16 on the surface of an optical fiber strand, with a resin coating removed therefrom, by plating, sputtering or other method. The coating metal is a material having good solderability, such as nickel or gold.

The metal-coated fiber 15 is inserted into between the case 5 and the cover 8, followed by soldering. As a result, the solder 9 joins the case 5 to the cover 8 and, at the same time, joins the metal layer 16 on the surface of the metal-coated fiber 15, thus hermetically sealing the interior of the case.

A second conventional technique is described, for example, in Japanese Patent Laid-Open No. 198973/1995. This publication discloses a hermetically sealed structure in an optical fiber introducing section, wherein a low-melting glass is used. FIG. 2 is a longitudinal sectional view showing the hermetically sealed structure in an optical fiber introducing section according to the second conventional technique. The second conventional technique will be explained with reference to FIG. 2.

Figure 2:
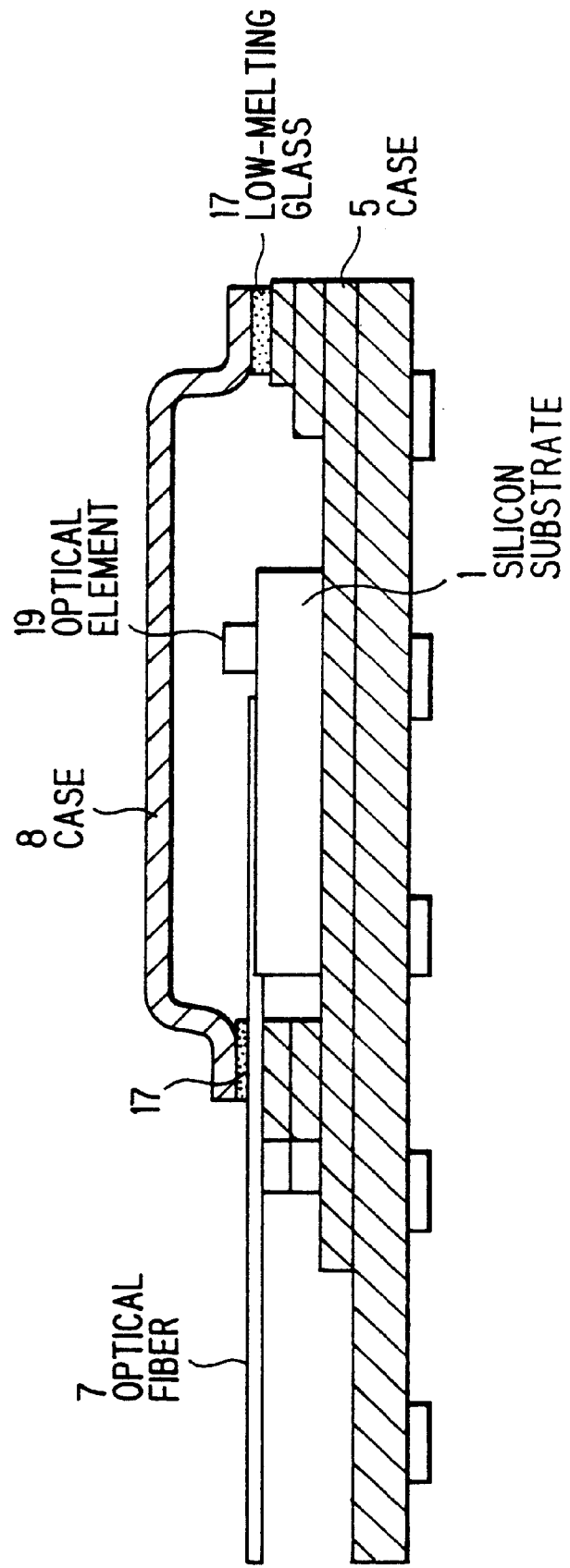
FIG. 2 is a cross-sectional view showing another conventional hermetically sealed structure in an optical fiber introducing section.

In FIG. 2, a quartz optical fiber is provided without coating of a metal layer, and, as with the first conventional technique, an optical element 19 and the optical fiber 7 are optically coupled with each other, followed by fixation of the optical fiber 7 onto a silicon substrate 1.

The optical fiber 7 is then inserted into between a case 5 and a cover 8, a low-melting glass 17 is provided in a portion, between the case 5 and the cover 8, in its whole circumference, and the low-melting glass is then heat-melted to hermetically seal the interior of the case.

A third prior art technique is a hermetically sealed structure in an optical fiber introducing section. This structure is such that the circumference of an optical fiber is sealed with a resin having a hermetically sealing property. FIG. 3 shows a longitudinal sectional view of the hermetically sealed structure in an optical fiber introducing section according to the third conventional technique. The third conventional technique will be explained with reference to FIG. 3.

Figure 3:
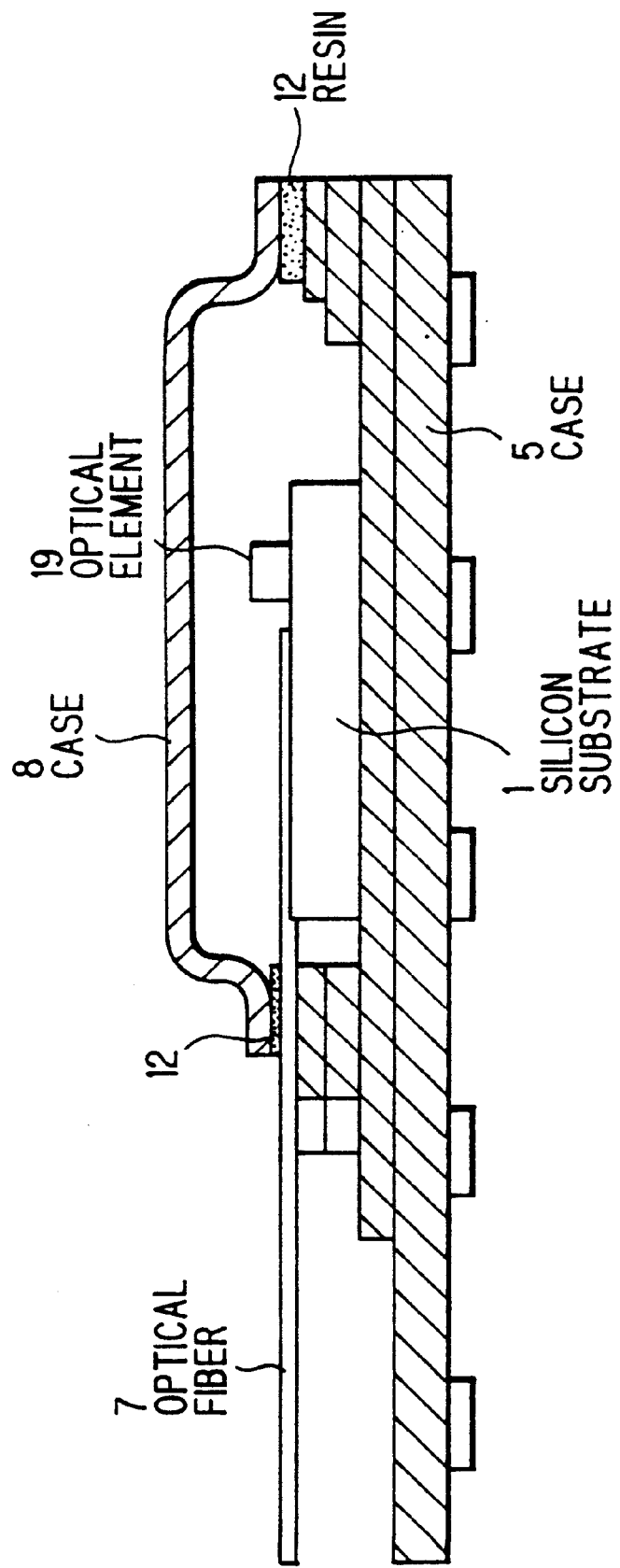
FIG. 3 is a cross-sectional view showing still another conventional hermetically sealed structure in an optical fiber introducing section.

In FIG. 3, an optical fiber is provided without coating of a metal layer, and, as with the first conventional technique, an optical element 19 and the optical fiber 7 are optically coupled with each other, followed by fixation of the optical fiber 7 onto a silicon substrate 1.

The optical fiber 7 is then inserted into between a case 5 and a cover 8, a resin 12 is filled into a portion between the case 5 and the cover 8, in its whole circumference, and the resin 12 is then cured to hermetically seal the interior of the case.

Next, preferred embodiments of the present invention will be described. The method for hermetically sealing an optical fiber introducing section according to the present invention, in its preferred embodiment, is characterized in that a conventional quartz optical fiber without coating of a metal layer is provided, an optical element and the optical fiber are optically coupled with each other within a case, a solder is filled into between the case of an optical module and a cover conforming to the shape of the case, thereby simply conducting hermetical sealing, and a resin, such as an adhesive, is filled into the optical fiber introducing section and then cured.

According to the preferred embodiment of the present invention, the case and the cover are hermetically sealed with a solder, and, in the optical fiber introducing section, the circumference of the optical fiber is substantially filled with the solder. Since the optical fiber per se is made of quartz glass, it is not subjected to alloyed junction by the solder, resulting in the creation of minute gaps at boundaries between the solder, which has been solidified after melting, and the optical fiber. Filling of the resin into between the optical fiber and the solder followed by curing of the resin can realize a high degree of airtightness of the optical device.

Thus, according to the preferred embodiment of the present invention, use of a conventional optical fiber without coating of a metal layer in the hermetical sealing realizes hermetical sealing of an optical fiber introducing section at a low cost.

Further, the variation in outer diameter of the optical fiber is so small that provision of a V-groove within the case enables the positioning of the optical fiber to be performed with a high accuracy. In addition, the attainable airtightness is high enough to ensure long-term reliability of an optical module, preferably not more than $10^{-7}$ atm.cc/sec.

Figure 4:
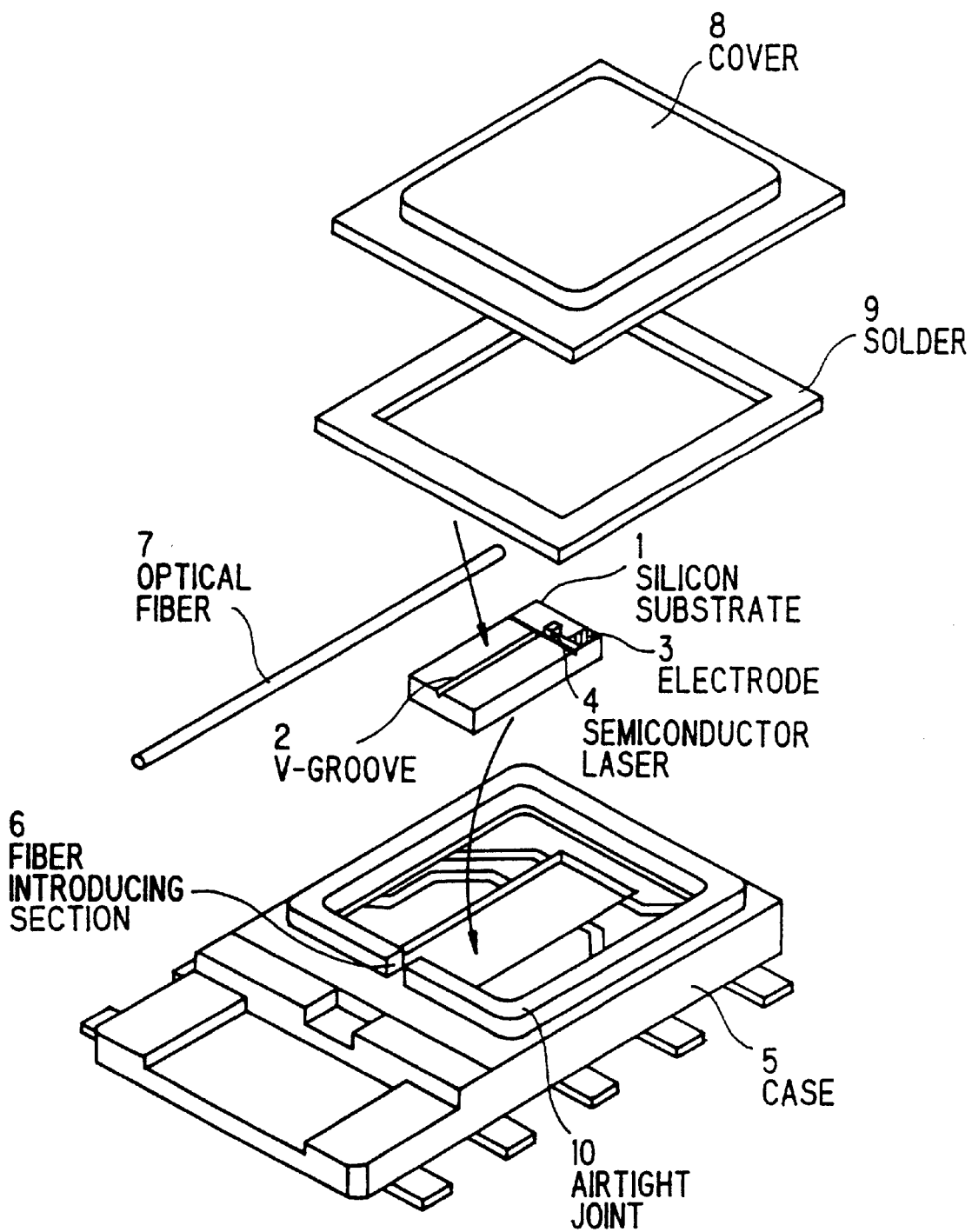
FIG. 4 is a perspective view showing a first preferred embodiment of the present invention.

FIG. 4 is a perspective view showing assembly of a first preferred embodiment of the hermetically sealing method according to the present invention. In FIG. 4, a silicon substrate 1 is one prepared by forming a necessary electrode pattern on both sides of a silicon wafer by photolithography and conducting chipping by dicing.

In the silicon substrate 1, a V-groove 2 is formed simultaneously with the formation of an electrode pattern. The groove 2 is formed by anisotropic etching. Since the shape of the groove 2 can be made constant, the positioning of the optical fiber can be performed with a submicron accuracy.

A semiconductor laser 4 is fixed, with a high-temperature solder, such as AuSn, to the electrode 3 formed by patterning on the top surface of the silicon substrate 1.

The silicon substrate 1 is fixed, with high-temperature solder, such as AuSn, to the cavity section of the case 5. At that time, positioning and fixing are carried out so that the center of the V-groove 2 is located at a given position relative to a fiber introducing section 6 provided in the case 5.

The case 5 is preferably a metallic case made of Kovar or the like, a ceramic package or the like from the viewpoints of airtightness, soldability, and cost.

The optical fiber 7 is highly acculately positioned relative to and optically coupled with the semiconductor laser 4 through the V-groove 2, and fixed to the V-groove 2 with a high-temperature solder, such as AuSn, or a heat-resistant adhesive, such as an epoxy adhesive.

A thin metal layer of nickel or gold is provided by plating on the cover 8, a hermetically sealing face 10, and the fiber introducing section 6 in consideration of solderability.

A solder material having a melting point, which has no thermal influence on the assembly section within the case, is used for the solder 9. Solder materials usable herein include Sn-Pb solder, Sn-Sb solder, Sn-In solder, and Au-Sn solder. The solder material is selected by taking into consideration the thermal influence on the interior of the case, temperature conditions under which the structure after hermetical sealing can withstand and the like.

In particular, when an Au-Sn solder is used for joining components within the case with an SnPb eutectic solder being used for the fixation of the case to a print board, an Sn-Sb solder or an Sn-In solder is selected as the solder for hermetical sealing so that the melting point of the solder for hermetical sealing is Au-Sn >solder for hermetical sealing >Sn-Pb.

The cover 8 and the solder 9 are positioned so as to conform to the shape of the case in its hermetically sealing face 10. The solder 9 is previously formed in the form of a square washer or the like so that it can be easily fed in the case 5.

Thereafter, the assembly is heated to the melting point of the solder 9, thereby fixing the cover 8, the case 5, and the optical fiber 7 with the aid of the solder 9.

Figure 5:
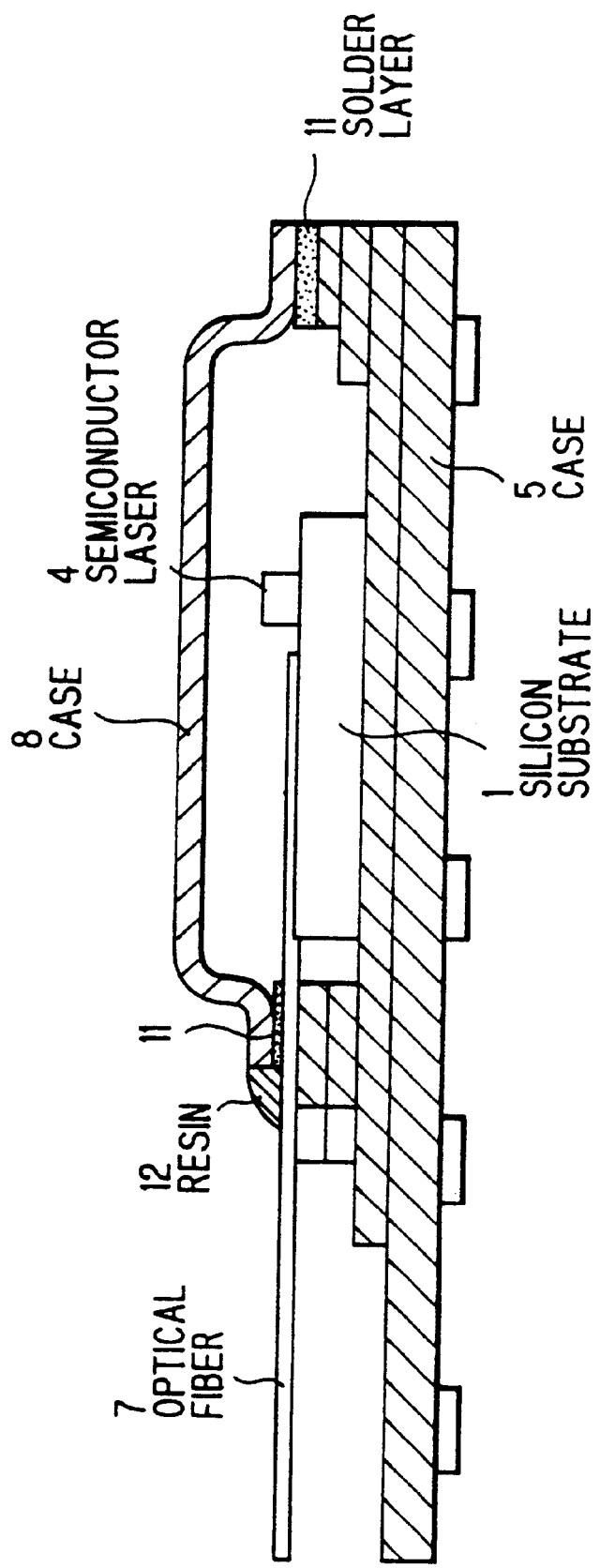
FIG. 5 is an explanatory cross-sectional view showing a hermetically sealed structure according to a first preferred embodiment of the present invention.

At that time, the circumference of the optical fiber 7 is filled with a solder layer 11 (see FIG. 5). Since, however, the solder layer 11 is not subjected to alloyed junction with the optical fiber 7 by the solder, reliable airtightness cannot be ensured in this stage.

A resin 12 is then filled on the surface of the optical fiber 7 and the solder layer 11 (see FIG. 5) and then cured, thereby conducting hermetical sealing. FIG. 5 is a longitudinal sectional view of a hermetically sealed structure completed through the above steps according to this preferred embodiment.

In this case, a resin having a viscosity of not more than 70 Pa.s is used as the resin 12 so that the resin can be easily filled into minute gaps.

In particular, when a cold curing silicone rubber is applied as the resin 12, good airtightness can be ensured over a wide temperature range because the silicone rubber has a cold/heat resistance of −40° C. to 200° C.

When good airtightness at a usual environmental temperature is contemplated, an epoxy resin or a UV (ultraviolet) resin may also be used as the resin 12.

Filling of the resin followed by curing of the resin permits minute gaps at boundaries between the solder layer 11 and the optical fiber 7 to be filled with the resin, which can provide airtightness high enough to ensure the reliability of the optical device, that is, an airtightness of not more than $10^{-7}$ atm.cc/sec.

In general, in the case of hermetical sealing with a resin alone, it is difficult to provide satisfactory airtightness due to low hermetical sealing level of the resin per se, uneven coating, unsatisfactory sealing area and the like. However, use of the resin for filling into minute gaps between the optical fiber and the solder layer according the present preferred embodiment of the present invention can greatly improve the airtightness of the whole case.

Figure 6:
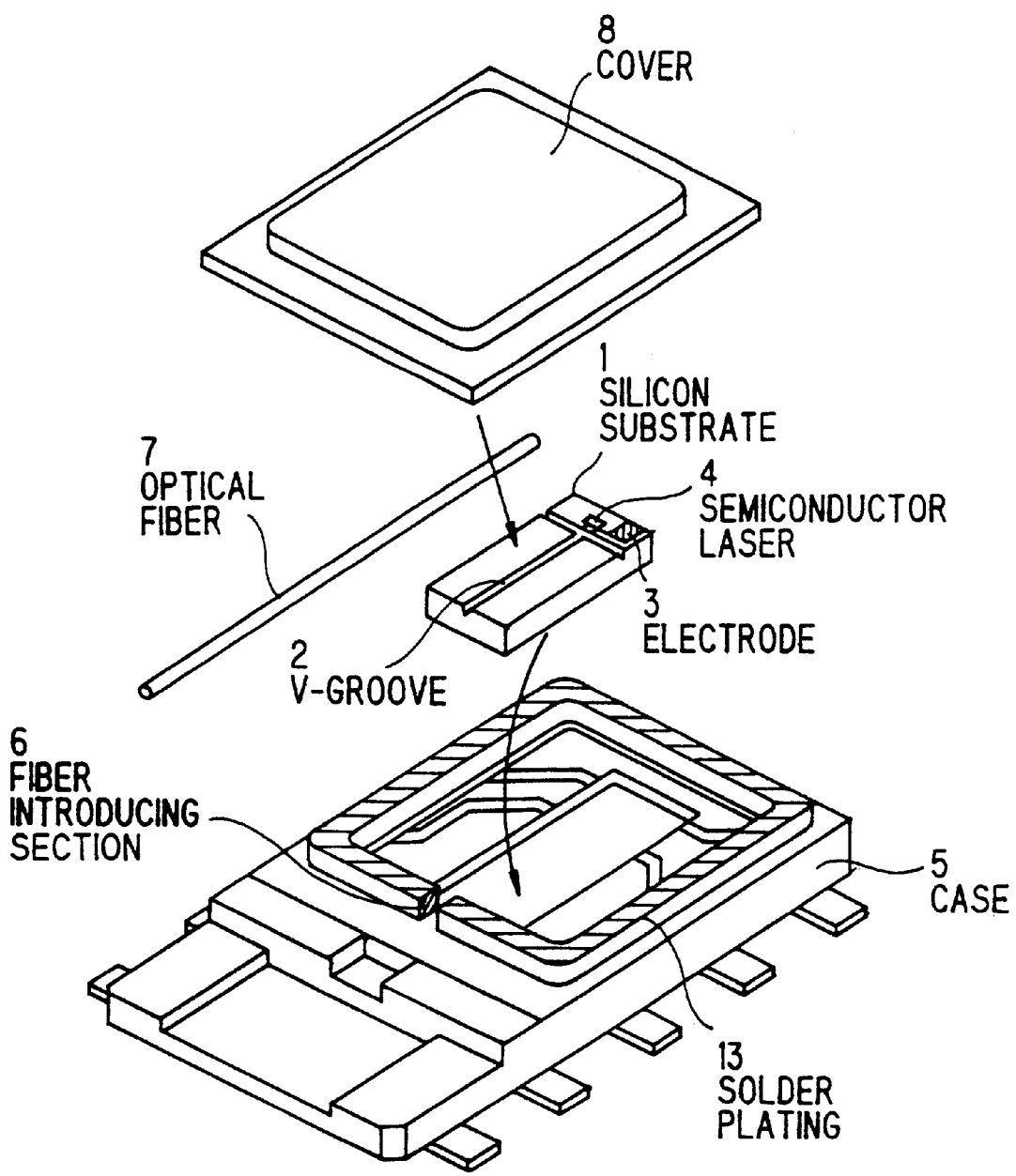
FIG. 6 is a perspective view showing a second preferred embodiment of the present invention.

The second preferred embodiment of the present invention will be explained in detail with reference to FIG. 6. FIG. 6 is a perspective view showing assembling of a hermetically sealed structure according to the second preferred embodiment of the present invention. In FIG. 6, in the present preferred embodiment, as with the first preferred embodiment, after a silicon substrate 1 with a semiconductor laser 4 mounted thereon is fixed within the case 5, an optical fiber 7 is mounted. A solder plating 13 is previously provided on a cover 8 and a case 5.

After the cover 8 and the case 5 are disposed at respective predetermined positions, the temperature is raised to the remelting temperature of the solder plating 13, thereby fixing the cover 8, the case 5, and the fiber 7 with the solder. Thereafter, hermetical sealing with a resin 12 is carried out.

Figure 7:
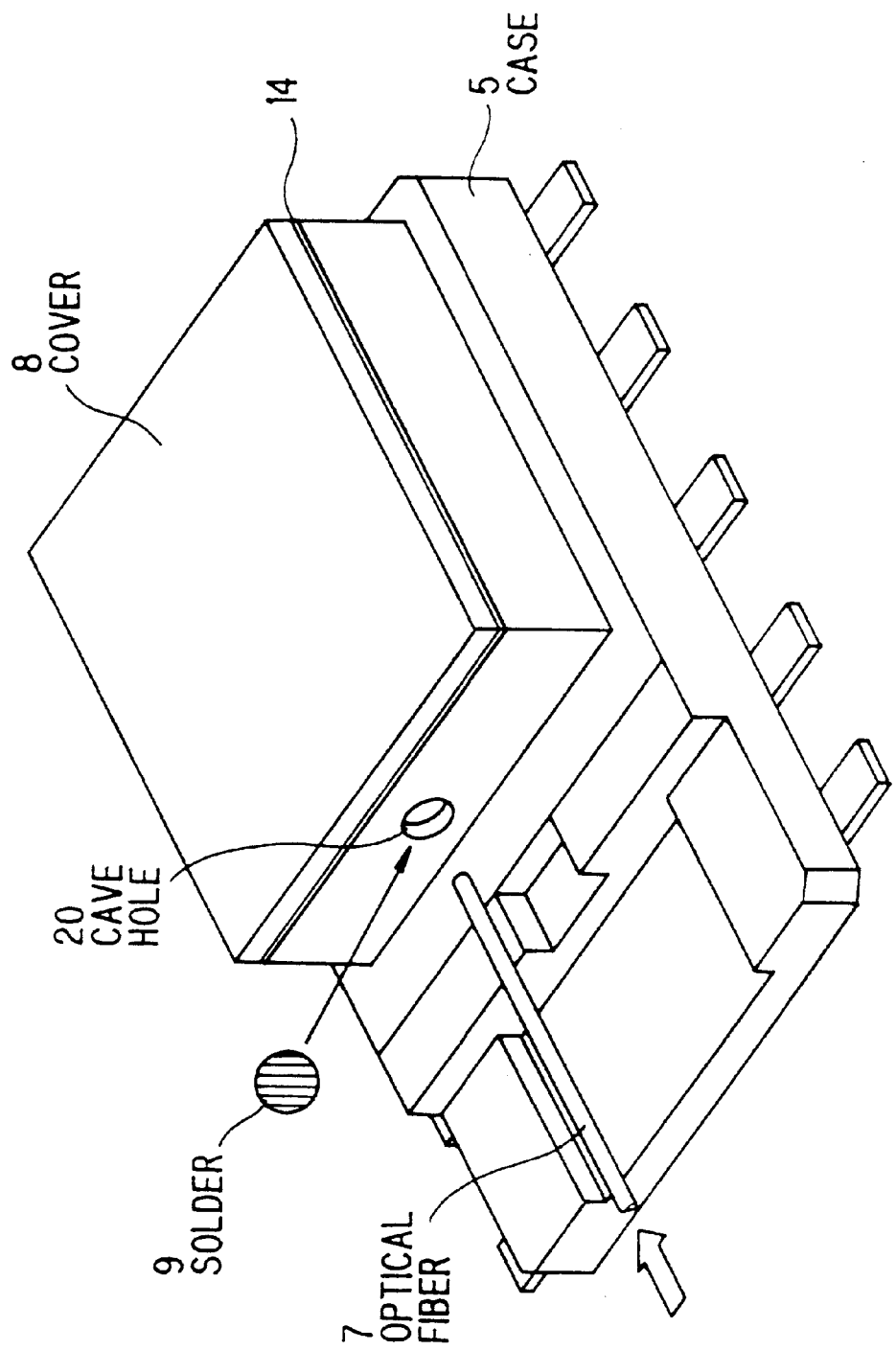
FIG. 7 is a perspective view showing a third preferred embodiment of the present invention.

Next, the third preferred embodiment of the present invention will be explained in detail with reference to FIG. 7. FIG. 7 is a perspective view showing assembling of a hermetically sealed structure according to the third preferred embodiment of the present invention. In FIG. 7, in the present preferred embodiment, as with the first preferred embodiment, a silicon substrate 1 with a semiconductor laser 4 mounted thereon is fixed within the case 5.

In the case 5, a cavity hole 20, passing through the case, rather than the rectangular groove is provided as the fiber introducing section.

At the time of mount of an optical fiber 7, the optical fiber 7 is inserted from the transverse direction and mounted and fixed onto a silicon substrate 1. The fixation of the cover 8 and the case 5 with a solder may be carried out in the same manner as described above in connection with the first preferred embodiment. In this case, the solder is also filled into the cavity hole 20. Thereafter, hermetical sealing with a resin 12 is carried out.

Joining between the cover 8 and the case 5 may be carried out by airtight welding, such as seam welding, rather than the soldering. In this case, the filling of the solder into the cavity hole 20 is carried out as a separate step, followed by hermetical sealing with a resin 12.

As described above, according to the method for hermetically sealing an optical fiber introducing section according to the present invention, a conventional quartz optical fiber is used without coating of a metal layer onto the optical fiber, advantageously enabling a hermetically sealed structure to be provided at a low cost.

Further, according to the present invention, since hermetical sealing is carried out using a solder having a melting point below that of a low-melting glass, a thermal influence on the optical element fixing section within the case and the protective coating of the optical fiber can be avoided.

Furthermore, filling of a solder around the optical fiber and filling of a resin into minute gaps at boundaries between the optical fiber and the solder followed by curing of the resin can simply realize a hermetically sealed structure having higher airtightness and reliability than hermetical sealing with the solder alone or the resin alone.

The invention has been described in detail with particular reference to preferred embodiments, but it will be understood that variations and modifications can be effected within the scope of the present invention as set forth in the appended claims.

What is claimed is:

1. A method for hermetically sealing a space through which an uncovered optical fiber extends into a case which houses an optical element which is optically coupled to the optical fiber, said method comprising:

filling at least a portion of the space with a hermetically sealing solder so as to substantially hermetically seal the space while leaving minute gaps at the boundaries between the solder and the uncovered optical fiber; and covering at least a portion of the solder with a hermetically sealing resin so as to close at least some of the minute gaps.

2. A method according to claim 1, further including the step of placing the optical fiber in a groove located in the case for aligning an end of the optical fiber with the optical element so as to optically couple the optical fiber to the optical element.

3. A method according to claim 2, wherein the optical element is mounted on a substrate located in the case and the groove is formed in the substrate.

4. A method according to claim 3, wherein the substrate is a silicon substrate.

5. A method according to claim 1, wherein the optical fiber is made of quartz.

6. A method according to claim 1, wherein the solder is formed between the optical fiber and a surrounding portion of the case and wherein the resin in located between the optical fiber and an outer surface of the case.

7. A method according to claim 6, wherein the case includes a cover and wherein the surrounding portion of the case is a portion of the cover.

8. A method according to claim 1, wherein the solder does not contain any flux component.

9. A method according to claim 8, wherein the resin is an epoxy resin.

10. A method according to claim 8, wherein the resin is a silicon resin.

11. A method according to claim 8, wherein the resin is a UV resin.

12. A method according to claim 1, wherein the resin is an epoxy resin.

13. A method according to claim 1, wherein the resin is a silicon resin.

14. A method according to claim 1, wherein the resin is a UV resin.

15. A hermetically sealed structure, comprising:

a case;

an optical element located in the case;

an uncovered optical fiber extending from a position outside of said case to a position inside of said case, the optical fiber being optically coupled to the optical element, the optical fiber extending into the case through an entry passage formed in the case;

a hermetically sealing solder filling at least a portion of the entry passage so as to substantially hermetically seal the space while leaving minute gaps at the boundaries between the solder and the uncovered optical fiber; and a hermetically sealing resin covering at least a portion of the solder so as to close at least some of the minute gaps.

16. A hermetically sealed structure according to claim 15, further including a groove located in the case for aligning an end of the optical fiber with the optical element so as to optically couple the optical fiber to the optical element, the optical fiber being located in the groove.

17. A hermetically sealed structure according to claim 16, wherein the optical element is mounted on a substrate located in the housing and the groove is formed in the substrate.

18. A hermetically sealed structure according to claim 17, wherein the substrate is a silicon substrate.

19. A hermetically sealed structure according to claim 15, wherein the optical fiber is made of quartz.

20. A hermetically sealed structure according to claim 15, wherein the solder is formed between the optical fiber and a surrounding portion of the case and wherein the resin in located between the optical fiber and an outer surface of the case.

21. A hermetically sealed structure according to claim 20, wherein the case includes a cover and wherein the surrounding portion of the case is a portion of the cover.

22. A hermetically sealed structure according to claim 15, wherein the solder does not contain any flux component.

23. A hermetically sealed structure according to claim 22, wherein the resin is an epoxy resin.

24. A method according to claim 22, wherein the resin is a silicon resin.

25. A method according to claim 22, wherein the resin is a UV resin.

26. A hermetically sealed structure according to claim 15, wherein the resin is an epoxy resin.

27. A method according to claim 15, wherein the resin is a silicon resin.

28. A method according to claim 15, wherein the resin is a UV resin.

* * * * *